Feb. 13, 1962 E. G. GUNN 3,020,992
MODULATING POWER-TRANSMISSION UNIT
Filed June 8, 1959
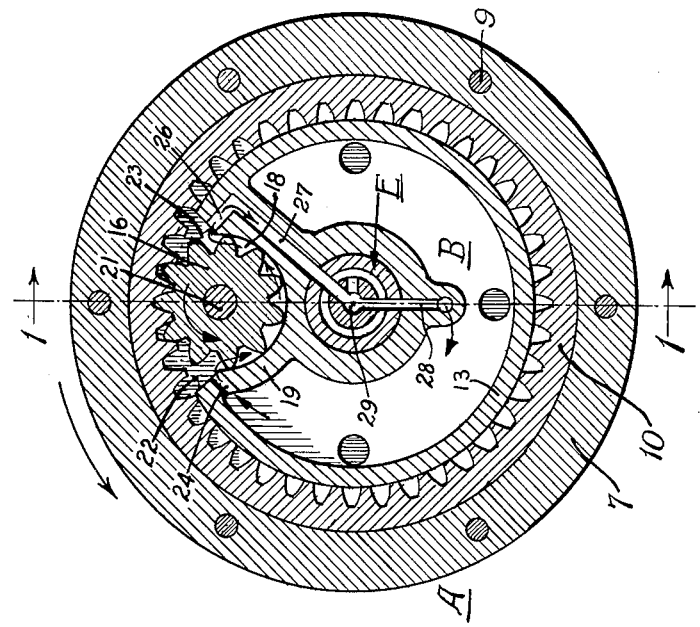
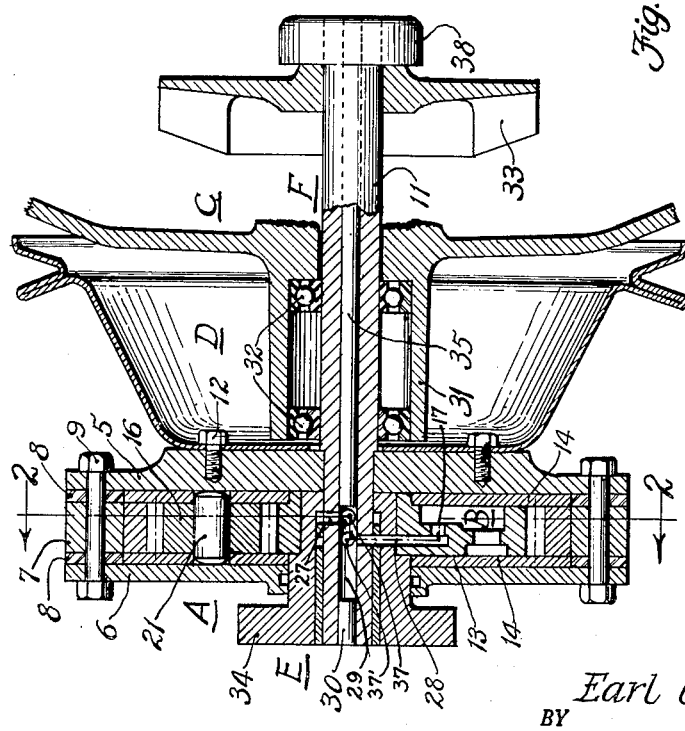
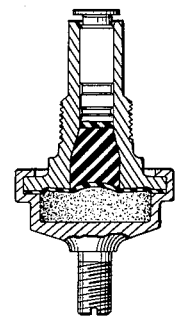
INVENTOR.
Earl G. Gunn
BY
ATTORNEY

United States Patent Office 3,020,992
Patented Feb. 13, 1962

3,020,992
MODULATING POWER-TRANSMISSION UNIT
Earl G. Gunn, Racine, Wis., assignor to Young Radiator Company, Racine, Wis., a corporation of Wisconsin
Filed June 8, 1959, Ser. No. 818,733
2 Claims. (Cl. 192—61)

This invention relates to a mechanism for modulating the transmission of power from a driving element to a driven element depending upon the power requirements of the driven element, as for example, the transmission of power between the engine of a motor-driven vehicle and the fan for the engine cooling system.

Where there is a driven element the operating conditions of which materially alter the need for the application of force from the driving element there is necessarily a waste of energy in maintaining such a power-transmission connection as to require the constant and maximum application of force from the driving element to the driven element. An example of such a condition is a direct connection between the engine of a motor-vehicle and the cooling fan for the cooling system for the engine.

The main objects of this invention are to provide an improved mechanism for modulating the transmission of power from a driving element to a driven element, conditioned upon the power requirements of the driven element; to provide an improved form of variable fluid-controlled connection between driving and driven elements for modulating the transmission of power from the one to the other element dependent upon the requirements of the other; to provide an improved fluid-controlled mechanism of this kind wherein the fluid reservoir is self-contained within the members which constitute the driving connection between the two members; to provide an improved fluid-controlled power-transmission unit of this kind which is especially adapted for interposition between the engine of a motor-driven vehicle and the cooling fan for the cooling system of the engine; and to provide an improved modulating power-transmission unit of this kind so simple in form and arrangement as to make its manufacture economical and its servicing minimal.

In the adaptation shown in the accompanying drawings:

FIG. 1 is a vertical, axial, sectional view of a modulating power-transmission unit constructed in accordance with this invention;

FIG. 2 is a vertical, radial, sectional view of the same taken on the plane of the line 2—2; the line 1—1 indicating the plane on which is taken the view of FIG. 1; and FIG. 3 is a sectional view of a type of thermostat suitable to use with this unit.

The essential concept of this invention involves a channeled shaft mounting a pair of relatively rotatable, concentrically-mounted, coplanar-disposed members one of which members has integrated therewith an internal gear and the other of which members is contactively embraced by the internal gear and is recessed to form a nearly-annular fluid reservoir and eccentrically mounts a pinion meshing with the internal gear so as to form spaces oppositely contiguous the gear-meshing pinion, one of which spaces communicates directly with the reservoir and the other of which spaces communicates indirectly with the reservoir through opposite-extending radial channels leading to the shaft channel through which shaft channel fluid flow is regulated by an axially-shiftable valve actuated by a thermostat to control the degree of permissible relative rotation of the two members.

A modulating power-transmission unit embodying the foregoing concept comprises a pair of members A and B, each made up of several parts, concentrically arranged in coplanar relationship for relative rotation on a support C, the external member A being connected to a driving element D and the internal member B being connected to a driven element E, with the degree of relative rotation between the members A and B being regulated by an oil-control mechanism F.

The external member A comprises a pair of disks 5 and 6 secured in spaced axial relationship by a ring 7, plates 8 and coupling bolts 9, and mounting an internal gear 10. The disk 5 here is shown a bit thicker than the disk 6 and is fixed to rotate with a shaft 11 and has secured thereto the driving element D by machine bolts 12. The gear 10, of conventional form, here is shown separately formed from the ring 7, although the gear teeth might be cut on the inner face of the member A. In this instance, however, the separately-made gear 10 is press-fitted into the member A and thereby so effectively integrated with the ring 7 as to insure their unitary operation.

The internal member B comprises a disk 13, secured between plates 14 and mounting a pinion 16. The disk 13 has one face recessed in opposition to one of the plates 14 to form a nearly-annular fluid reservoir 17 and a substantially semi-circular pocket 18 extending inwardly from the periphery of the disk 13 and separated from the reservoir 17 by an arcuate wall 19. The plates 14 are equal in diameter with the disk 13 and one serves as a closure for the reservoir 17.

The pinion 16 is journaled in the pocket 18 on a pin 21 and so meshes with the gear 10 as to provide spaces 22 and 23 oppositely contiguous to the meshing gear 10 and pinion 16. The space 22 communicates directly with the reservoir 17 through a port 24 in the wall 19. The space 23 opens to a port 26, on the other side of this wall 19, and indirectly communicates with the reservoir 17 through radial channels 27 and 28, in the disk 13, connecting with an axial channel 29 in the shaft 11. The outer end of the channel 29 is closed by a plug 30.

The nature of the support C would depend upon the equipment with which this modulating power transmission unit is used. As indicated here it is used between the engine and fan of a motor-vehicle cooling system, hence the support C is a part of the pump housing. As here shown, the support C has a hub 31 for journaling the shaft 11 on anti-friction bearings 32. At its inner end the shaft 11 mounts a pump propeller 33.

The driving element D here is shown as a V-pulley secured to the disk 5 by machine bolts 12.

The driven element E here is shown as a hub and is so secured to the disk 13 as to be practically integrated therewith, whereby the two parts revolve as a unit. Since this adaptation here is shown for use with vehicle-engine cooling system, the outer end of the hub on the driven element E is formed with a heavy flange 34 for attachment of the blades of a fan (not shown).

The oil-control valve mechanism F is in the form of a valve rod 35 attached to a thermostat 38. The rod 35 is dimensioned to closely fit but easily slide in the shaft channel 29. In its most retracted position, the end 36 of the rod 35 is disposed inwardly adjacent radial ports 37 and 37' in the shaft 11 affording communication between the channels 27 and 28. The thermostat 38, connected to the other end of the rod 35, is of a type such that changes in the ambient temperature conditions result in an axial shifting of the valve rod 35. In the adaptation herein shown, the thermostat 38 would be exposed to the coolant of the engine cooling system, circulated by the pump propeller 33.

A type of thermostat suitable for this operation is shown in FIG. 3. This is known as a "Vernatherm" which is in common use for the operation of aircraft valves.

The operation of this improved modulating power-transmission unit, assuming its use in a vehicle-engine cooling system, is as follows:

With the engine running, and belted to the driving element D, and the valve rod 35 retracted to completely open the shaft port 37, the rotating gear 10 and the responding pinion 16 moving in the direction of the larger arrows in FIG. 2, will cause a flow of oil as indicated by the smaller arrows in this same figure. Such oil flow is through the port 24 into the space 22, around the lower periphery of the pinion 16 opposed to the wall 19 into the space 23 and out the port 26 through the channel 27 to the channel 29 in the shaft 11 via the port 37, from whence the oil flows through the port 37′ to the channel 28 back to the reservoir 17 and a point quite distant from the port 24. Such oil flow being unrestricted, the driven element E will remain stationary, or, at the most, idling slowly.

As the engine-system coolant rises in temperature, the thermostat 38 will shift the valve rod 35 to initiate a restriction of the oil flow through the port 37. Such restriction will tend to back up the oil flow to and around the pinion 16 and create a restraint against free rotation of pinion 16. The result will be a degree of rotation of the disk 13 with the gear 10 but at a much less rate than the integrated ring 7 of the member A.

As the rising temperature of the engine coolant causes the thermostat 38 to further shift the valve rod 39 to increasingly restrict the port 37, the greater restraint on the oil flow to and around the pinion 16 will increase its tendency to rotate on its own axis until such time as it is completely restrained against any relative movement to the gear 10. Thereupon the driven element E will rotate at the same speed as the driving element D.

As the temperature of the engine coolant recedes the thermostat 38 will begin to retract the valve rod 35 and initiate an opening of the port 37. To the extent that this permits a resumption of some oil flow to and around the pinion 16, there will be a gradual lessening of the speed of rotation of the driven element E as compared with the continuing constant rotation of the driving element D.

Variations and modifications in the details of structure and arrangement of the parts may be resorted to within the spirit and coverage of the appended claims.

I claim:

1. A modulating power-transmission unit comprising a bearing support, an axially-channeled shaft journaled on the support, a pair of members mounted concentrically of the shaft in coplanar relationship for relative rotation, one of the members being fixed with the shaft and connected to a driving element, the other member being rotative on the shaft and connected to a driven element, an internal gear integrated with the one member and embracively contacting the other member, the other member being recessed radially outward of the relative support of the other member on the shaft to form a nearly-annular fluid reservoir within the thickness of the other member and a walled-off substantially semi-circular peripheral pocket in radial coplanar relationship and equal in width with the reservoir, a pinion journaled on the other member within the pocket and meshing with the gear, the other member having ports communicating with spaces oppositely contiguous to the meshing pinion and gear, one of which ports communicates directly with the reservoir, the other member also having radial channels which afford communication respectively between the shaft channel and the other port of the reservoir at a point remote from the communication therewith of the one port, and a thermostatically-actuated valve rod slidably mounted in the shaft channel relative to the ports for regulating the flow of fluid through the other-member radial channels for determining the degree of the permissible rotation between the two members.

2. A modulating fan drive comprising a pump having a support bearing, an axially-channeled shaft having axially-spaced radial ports leading from the channel to the exterior of the shaft, the shaft mounting a pump propeller and being journaled on the support bearing, a fan hub journaled on the shaft in axial opposition to the pump propeller, a pair of members concentrically mounted relative the shaft in radial coplanar relationship between the bearing and the fan hub, the external member being fixed to rotate with the shaft directly adjacent the bearing and mounting a drive pulley, the internal member being fixed to rotate with the fan hub, an internal gear integrated with the external member and embracively contacting the internal member, the internal member being recessed radially outward of the rotative support of the internal member on the shaft to form a nearly-annular fluid reservoir within the thickness of the internal member and a walled-off substantially semi-circular peripheral pocket in radial coplanar relationship and equal in width with the reservoir, a single pinion journaled on the internal member within the pocket and meshing with the gear, the internal member having ports communicating with spaces oppositely contiguous the meshing pinion and gear, one of which ports communicates directly with the reservoir, the internal member also having radial channels which afford communication respectively between the shaft channel ports and the other port and the reservoir at a point remote from the communication therewith of the one port, a valve rod slidably mounted in the shaft channel for axial movement to control communication through the shaft ports, and a thermostat in the pump connected to actuate the valve rod for determining the degree of permissible rotation between the two members.

References Cited in the file of this patent

UNITED STATES PATENTS

| | | |
|---|---|---|
| 1,317,415 | Baker et al. | Sept. 30, 1919 |
| 1,418,126 | Cartlidge | May 30, 1922 |
| 1,820,035 | Stokes | Aug. 25, 1931 |
| 2,172,975 | Huthsing | Sept. 12, 1939 |
| 2,382,114 | Stephens | Aug. 14, 1945 |
| 2,396,149 | Bock | Mar. 5, 1946 |
| 2,637,308 | Dodge | May 5, 1953 |
| 2,902,127 | Hardy | Sept. 1, 1959 |